(12) United States Patent
McIntosh (10) Patent No.: US 11,779,172 B2
(45) Date of Patent: *Oct. 10, 2023

(54) DEPLOYABLE TRANSFER MEMBER FOR A LAVATORY

(71) Applicant: THE BOEING COMPANY, Chicago, IL (US)

(72) Inventor: Darren Carl McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,069

(22) Filed: Dec. 28, 2022

(65) Prior Publication Data
US 2023/0134854 A1    May 4, 2023

Related U.S. Application Data

(62) Division of application No. 16/815,092, filed on Mar. 11, 2020, now Pat. No. 11,571,093.

(51) Int. Cl.
*A47K 17/02* (2006.01)
*B64D 11/02* (2006.01)

(52) U.S. Cl.
CPC ............ *A47K 17/024* (2013.01); *B64D 11/02* (2013.01)

(58) Field of Classification Search
CPC ....... A47K 17/02; A47K 17/024; B64D 11/02
USPC ............................................................ 4/425
See application file for complete search history.

(56) References Cited

U.S. PATENT DOCUMENTS

| | | | |
|---|---|---|---|
| 6,185,759 B1 * | 2/2001 | Staudenmayer | A47K 17/026 4/663 |
| 2002/0062521 A1 * | 5/2002 | Itakura | B64D 11/02 4/664 |
| 2010/0251469 A1 * | 10/2010 | Kim | A47K 17/024 4/254 |

* cited by examiner

*Primary Examiner* — Lauren A Crane
(74) *Attorney, Agent, or Firm* — The Small Patent Law Group LLC; Joseph M. Butscher (57) ABSTRACT

A lavatory includes a toilet, a wall proximate to the toilet, and a transfer member moveably secured to the wall. The transfer member is moveable between a stowed position away from the toilet, and a deployed position. At least a portion of the transfer member in the deployed position is supported by at least a portion of the toilet.

20 Claims, 8 Drawing Sheets

DEPLOYABLE TRANSFER MEMBER FOR A LAVATORY

RELATED APPLICATIONS

This application is a division of U.S. patent application Ser. No. 16/815,092, entitled "Deployable Transfer Member for a Lavatory," filed Mar. 11, 2020, now U.S. Pat. No. 11,571,093, which is hereby incorporated by reference in its entirety.

FIELD OF THE DISCLOSURE

Embodiments of the present disclosure generally relate to a lavatory, such as within a commercial aircraft, and more particularly to a lavatory having a deployable transfer member.

BACKGROUND OF THE DISCLOSURE

Commercial aircraft are used to transport passengers between various locations. A typical commercial aircraft includes one or more lavatories within an internal cabin.

Space within a commercial aircraft is limited. Notably, a lavatory within a commercial aircraft is typically relatively small. A larger lavatory would necessarily occupy more space within a commercial aircraft, and may prevent additional passenger seating within an internal cabin. Aircraft operators typically prefer to have additional passenger seating within an internal cabin, as the additional passenger seating leads to increased revenues.

Persons of reduced mobility (such as individuals having disabilities, injuries, or a reduced ability to move) may find the confined space of a lavatory within a commercial aircraft relatively difficult to approach and maneuver therein. Such individuals may have difficulty moving within the lavatory, such as between an entrance and a toilet, and between a toilet and a sink.

Accordingly, certain manufacturers have designed larger lavatories that are specifically designed for persons of reduced mobility. However, in expanding the size of the lavatory, space for other components (such as passenger seating) within an internal cabin is necessarily reduced.

Persons of limited ability who use wheelchairs may use a separate board to transfer from a wheelchair to a toilet. The board is typically a separate and distinct device. However, such a separate and distinct board may be lost. Further, individuals may opt not to use the board due to the extra steps of retrieving the board and positioning it between a wheelchair and a toilet, particularly within the confined space of a lavatory of an aircraft. Further, during use, a wheelchair may inadvertently move, thereby causing the board to shift or fall, which may cause discomfort or even injury to the individual.

SUMMARY OF THE DISCLOSURE

A need exists for a system and method for allowing individuals to independently more easily and efficiently use an existing lavatory, such as within an internal cabin of a commercial aircraft. A need exists for a lavatory that is easily accessible by persons of reduced mobility. Further, a need exists for a safe, readily accessible, consistent, independent, and easy-to-use system and method for transferring between different areas within a lavatory.

With those needs in mind, certain embodiments of the present disclosure provide a lavatory including a toilet, a wall proximate to the toilet, and a transfer member moveably secured to the wall. The transfer member is moveable between a stowed position away from the toilet, and a deployed position. At least a portion of the transfer member in the deployed position is supported by at least a portion of the toilet. In at least one embodiment, the lavatory is within an internal cabin of a vehicle.

In at least one embodiment, the transfer member includes a bench segment, and a toilet segment. The toilet segment is supported by the at least portion of the toilet when the transfer member is in the deployed position.

In at least one embodiment, the lavatory also includes a sink. The bench segment includes a front end proximate to an entrance of the lavatory. The bench segment extends toward the sink when the transfer member is in the deployed position. The front end is proximate to a door of the lavatory when the transfer member is in the deployed position. The toilet segment is wider than the bench segment.

In at least one embodiment, the toilet segment includes a front end including a front arcuate support including a first arcuate support prong having a first arcuate, smooth, and blunted exposed edge. The toilet segment also includes an intermediate body connected to the front end. The intermediate body includes an inwardly-curved recess having a second arcuate, smooth, and blunted exposed edge. The toilet segment also includes a rear end including a rear arcuate support including a second arcuate support prong having a third arcuate, smooth, and blunted exposed edge.

In at least one embodiment, the transfer member in the stowed position is folded upright against the wall.

In at least one embodiment, the lavatory also includes one or more hinges that pivotally couple the transfer member to the wall.

In at least one embodiment, the transfer member includes a first securing device, and the wall includes a second securing device. The first securing device couples to the second securing device when the transfer member is in the stowed position to securely retain the transfer member in the stowed position.

Certain embodiments of the present disclosure provide a method of providing a lavatory. The method includes moveably securing a transfer member to a wall proximate to a toilet. Said moveably securing includes allowing the transfer member to be moved between a stowed position away from the toilet, and a deployed position. The method also includes supporting at least a portion of the transfer member in the deployed position by at least a portion of the toilet.

Certain embodiments of the present disclosure provide a vehicle including an internal cabin, and a lavatory within the internal cabin, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a lavatory including a deployable transfer member. The transfer member is moveably coupled to a portion of the lavatory, such as a wall of the lavatory. The transfer member is configured to be moved between a stowed position, such as upright against the wall, and a deployed position, in which an individual may slide over the transfer member onto a toilet within the lavatory. In the stowed position, the transfer member may be upright against the wall. In the deployed position, the transfer member is horizontal or otherwise parallel to a floor within the lavatory, allowing an individual to sit on the transfer board and move (such as slide) between different positions. In at least one embodiment, the transfer member extends between an entrance of the lavatory (such as proximate to a door) and a toilet. The transfer member is or otherwise includes a smooth panel, board, bracket, rail, assembly, and/or the like.

Certain embodiments of the present disclosure provide a method of using a lavatory, including approaching an entrance of a lavatory, deploying a transfer member, moving (for example, sliding) along the transfer member to a toilet and from the toilet back toward the entrance, and stowing the transfer member.

Embodiments of the present disclosure allow for increased accessibility and mobility within a confined space of a lavatory, such as within a commercial aircraft. Further, embodiments of the present disclosure provide a lightweight and low-cost transfer member.

Embodiments of the present disclosure provide a lavatory having a deployable transfer member that provides airline operators an attractive, optional, accessible feature that can be integrated into new or existing aircraft. The transfer member may be specifically configured for unique certification requirements (for example, stress, flammability, etc.), such as promulgated by the United States Federal Aviation Administration (FAA) and sanitary construction requirements promulgated by the United States Food and Drug Administration (FDA).

In at least one embodiment, the transfer member is permanently attached to a wall of a lavatory. As such, an individual is able to readily see the transfer member, and is more likely to use the transfer member (as compared to a separate and distinct board that may be lost).

In at least one embodiment, the transfer member moveably couples to a wall of the lavatory, such as through a rotary damper barrel hinge, such as approved by the FAA for use within an aircraft lavatory.

The transfer member is hinged and stowed neatly against a wall when not in use. The transfer member is moved into a deployed position, such as by being folded down over a toilet seat. In the deployed position, at least a portion of the transfer member sits directly on top of a portion of a toilet seat. As such, the toilet seat supports the transfer board and the weight of an individual seated on the transfer member. Because the toilet seat supports the transfer member in the deployed position, the transfer member need not include additional supports, such as bracing struts. Alternatively, the transfer member may include one or more deployable braces or other such support.

In at least one embodiment, the transfer member has a contoured, smooth radial profile, that encourages and assists flow transfer between different positions within a lavatory (such as a first position adjacent to a lavatory door and opposite to wash basin sink and a second position on a toilet).

Overall, embodiments of the present disclosure provide persons of reduced mobility with additional options that provide dignified independence for lavatory use. Embodiments of the present disclosure allows persons of reduced mobility to transfer from an on-board wheelchair, for example, to the transfer member in a deployed position through an opened door of the lavatory. Once inside the lavatory, the door is closed and locked by the individual, while seated on the transfer member. The individual may then slide over the transfer member onto the toilet. The deployable transfer member allows persons of reduced mobility full independence to use the toilet and wash their hands.

Figure 1:
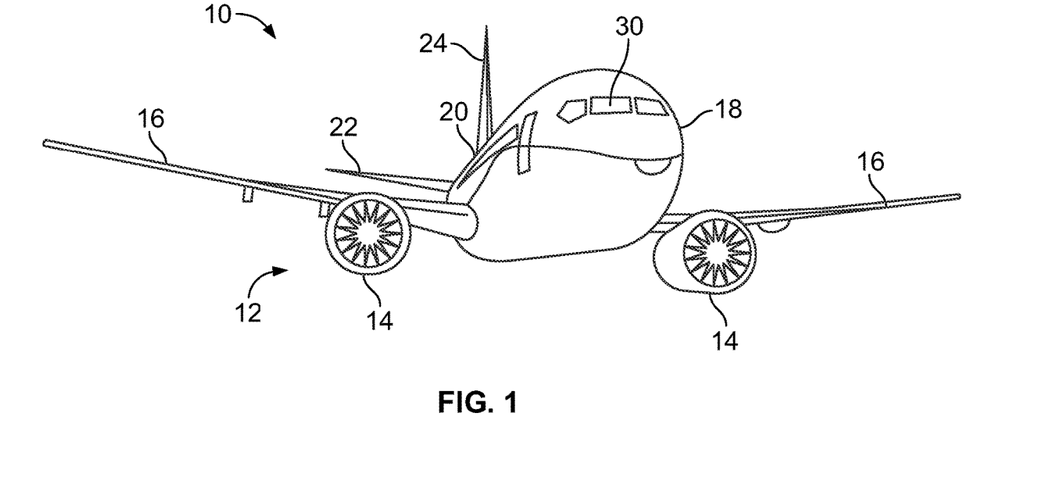
FIG. 1 illustrates a perspective front view of an aircraft, according to an embodiment of the present disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like. At least one of the lavatories within the internal cabin 30 includes a deployable transfer member, as described herein.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 2:
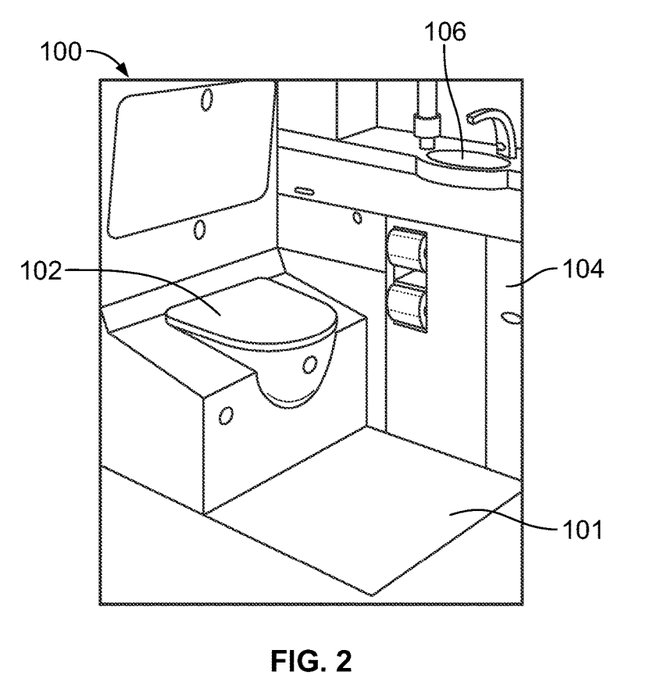
FIG. 2 illustrates a perspective internal view of a lavatory, according to an embodiment of the present disclosure.

FIG. 2 illustrates a perspective internal view of a lavatory 100, according to an embodiment of the present disclosure. The lavatory 100 is an example of an enclosed space or chamber, such as within the internal cabin of the aircraft 10, shown in FIG. 1. The lavatory 100 may be onboard an aircraft, as described above. Optionally, the lavatory 100 may be onboard various other vehicles. In other embodiments, the lavatory 100 may be within a fixed structure, such as a commercial or residential building. The lavatory 100 includes a base floor 101 that supports a toilet 102, cabinets 104, and a sink 106 or wash basin. The lavatory 100 may be arranged differently than shown. The lavatory 100 may include more or less components than shown.

Figure 3:
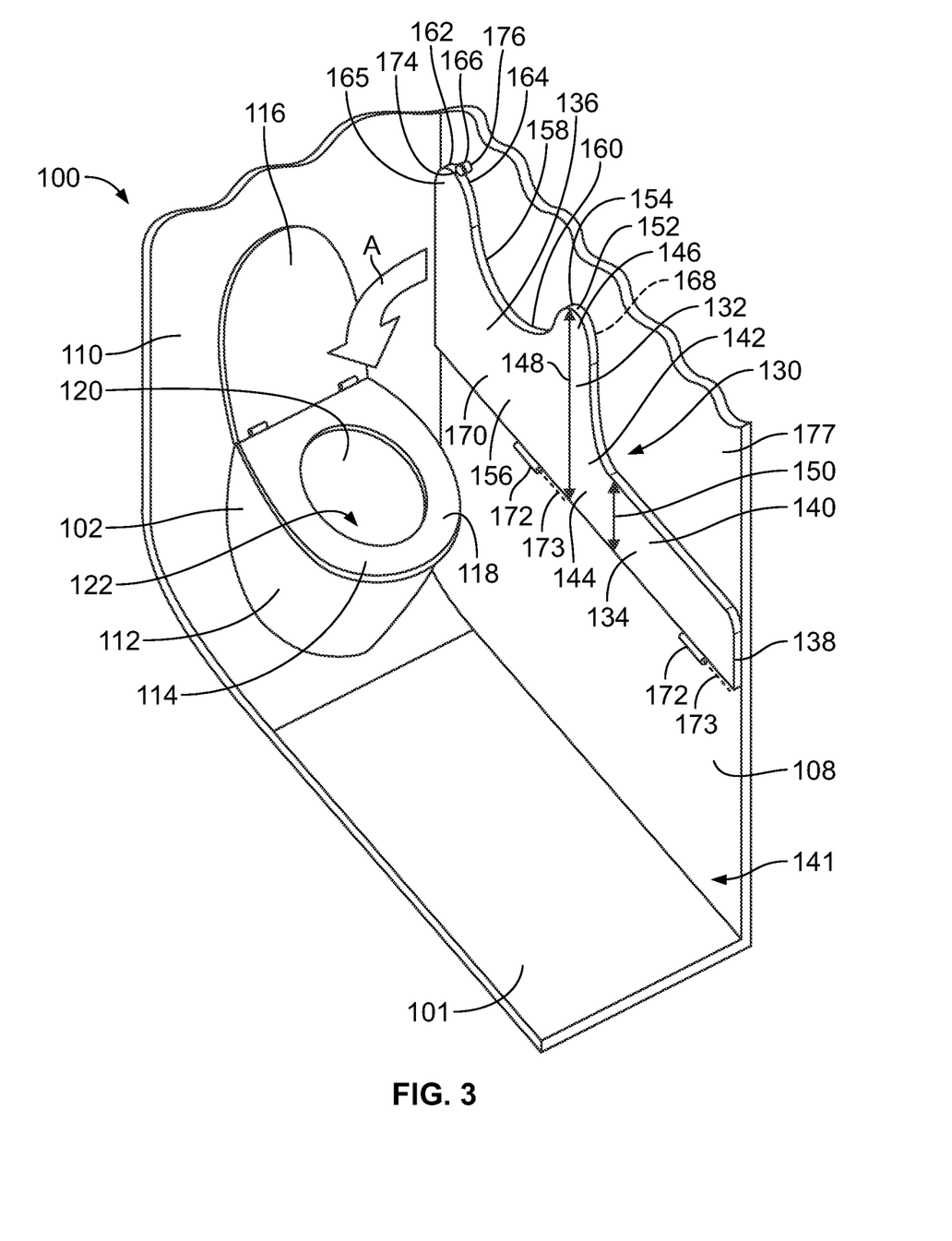
FIG. 3 illustrates a perspective top view of a lavatory having a transfer member in a stowed position, according to an embodiment of the present disclosure.
Figure 4:
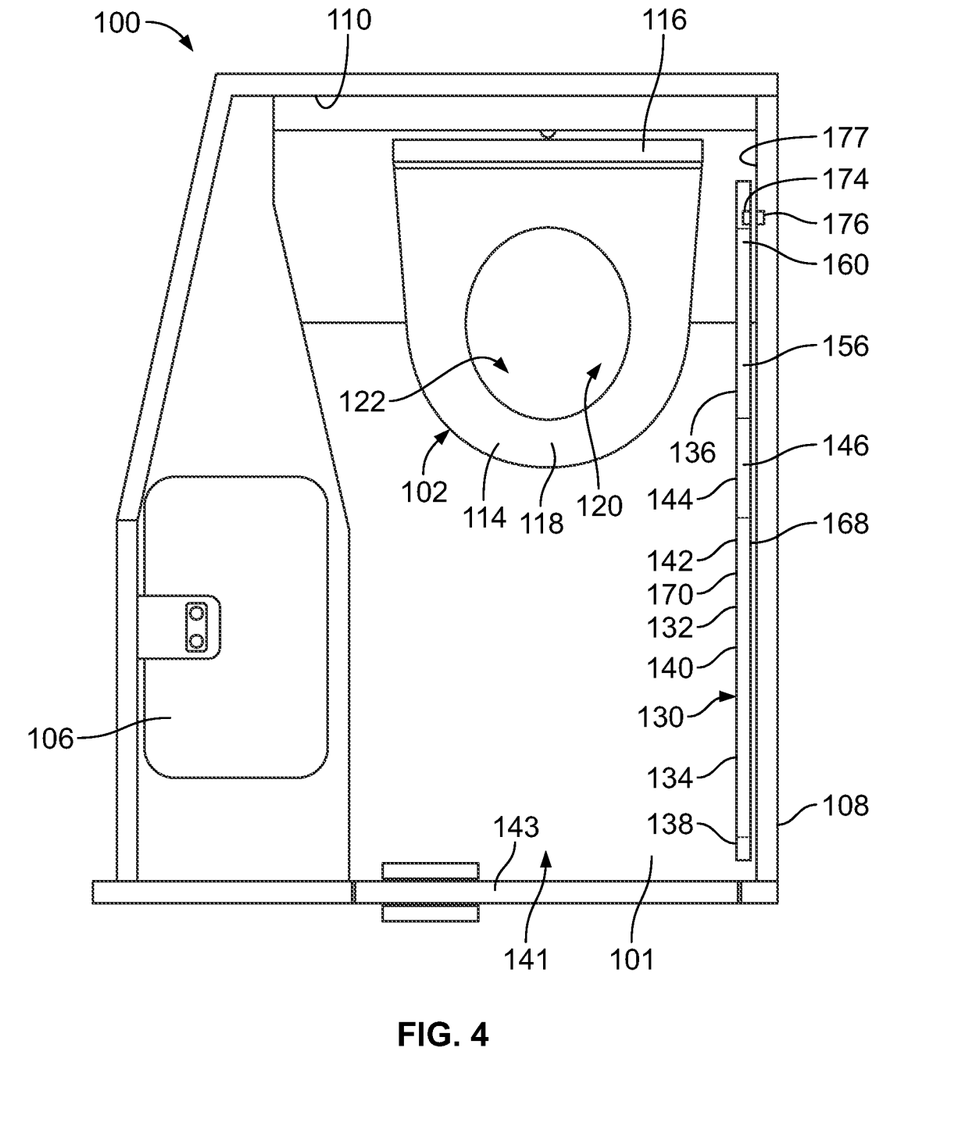
FIG. 4 illustrates a top view of the lavatory having the transfer member in the stowed position.

FIG. 3 illustrates a perspective top view of the lavatory 100 having a transfer member 130 in a stowed position, according to an embodiment of the present disclosure. FIG. 4 illustrates a top view of the lavatory 100 having the transfer member 130 in the stowed position. Referring to FIGS. 3 and 4, the lavatory 100 includes a side wall 108 extending upwardly from the base floor 101. The side wall 108 may be orthogonal (for example, perpendicular) to the base floor 101. The side wall 108 and the base floor 101 also connect to a rear wall 110. The toilet 102 is proximate the rear wall 110. For example, the toilet 102 may outwardly extend from the rear wall 110. Optionally, the lavatory 100 may be re-oriented such that the side wall is a rear wall, and vice versa.

The toilet 102 includes a bowl 112 and a seat 114 moveably secured to the bowl 112. A cover or lid 116 may also be moveably secured to the bowl 112. The seat 114 includes a seating rim 118 that defines a central opening 120 that is in fluid communication with an internal chamber 122 of the bowl 112.

As described herein, the lavatory 100 includes the toilet 102, a wall proximate to the toilet 102 (such as the side wall 108), and the transfer member 130 moveably coupled to the wall. The transfer member 130 is configured moveable between a stowed position away from the toilet 102, and a deployed position. At least a portion of the transfer member 130 in the deployed position is supported by the toilet 102.

The transfer member 130 is moveably secured to the side wall 108. The side wall 108 is proximate to the toilet 102. For example, the side wall 108 may be within 24 inches or less of the toilet 102. The transfer member 130 is securely attached to the side wall 108. That is, the transfer member 130 is not a separate and distinct board that is susceptible to being lost, and/or not used due to not being readily seen and available. The transfer member 130 includes a main body 132, which may be formed of plastic, metal, composite material, and/or the like. The transfer member 130 may be a panel, board, rail, block, assembly, and/or the like.

The main body 132 of the transfer member 130 includes a bench segment 134 connected to a toilet segment 136. The bench segment 134 and the toilet segment 136 may be integrally molded and formed together. That is, the transfer member 130 may be integrally molded and formed as a single piece, such as of metal, plastic, composite, and/or the like.

The bench segment 134 includes a first or leading end 138 proximate to an entrance 141 of the lavatory 100. A door 143 is disposed at the entrance 141. The first end 138 connects to a bench body 140 that extends toward the rear wall 110 and the toilet segment 136. The bench body 140 connects to a second or rear end 142 that connects to the toilet segment 136.

The toilet segment 136 includes a front end 144 including a front arcuate support 146. The front arcuate support 146 has a width 148 that is greater than a width 150 of the bench segment 134. The front arcuate support 146 includes an arcuate support prong 152 having an arcuate, smooth, and blunted exposed edge 154.

The front end 144 connects to an intermediate body 156 that includes an inwardly-curved recess 158. Like the front arcuate support 146, the recess 158 includes an arcuate, smooth, and blunted exposed edge 160.

The intermediate body 156, in turn, connects to a rear end 162 including a rear arcuate support 164. The rear arcuate support 164 includes an arcuate support prong 165 having an arcuate, smooth, and blunted exposed edge 166.

Figure 5:
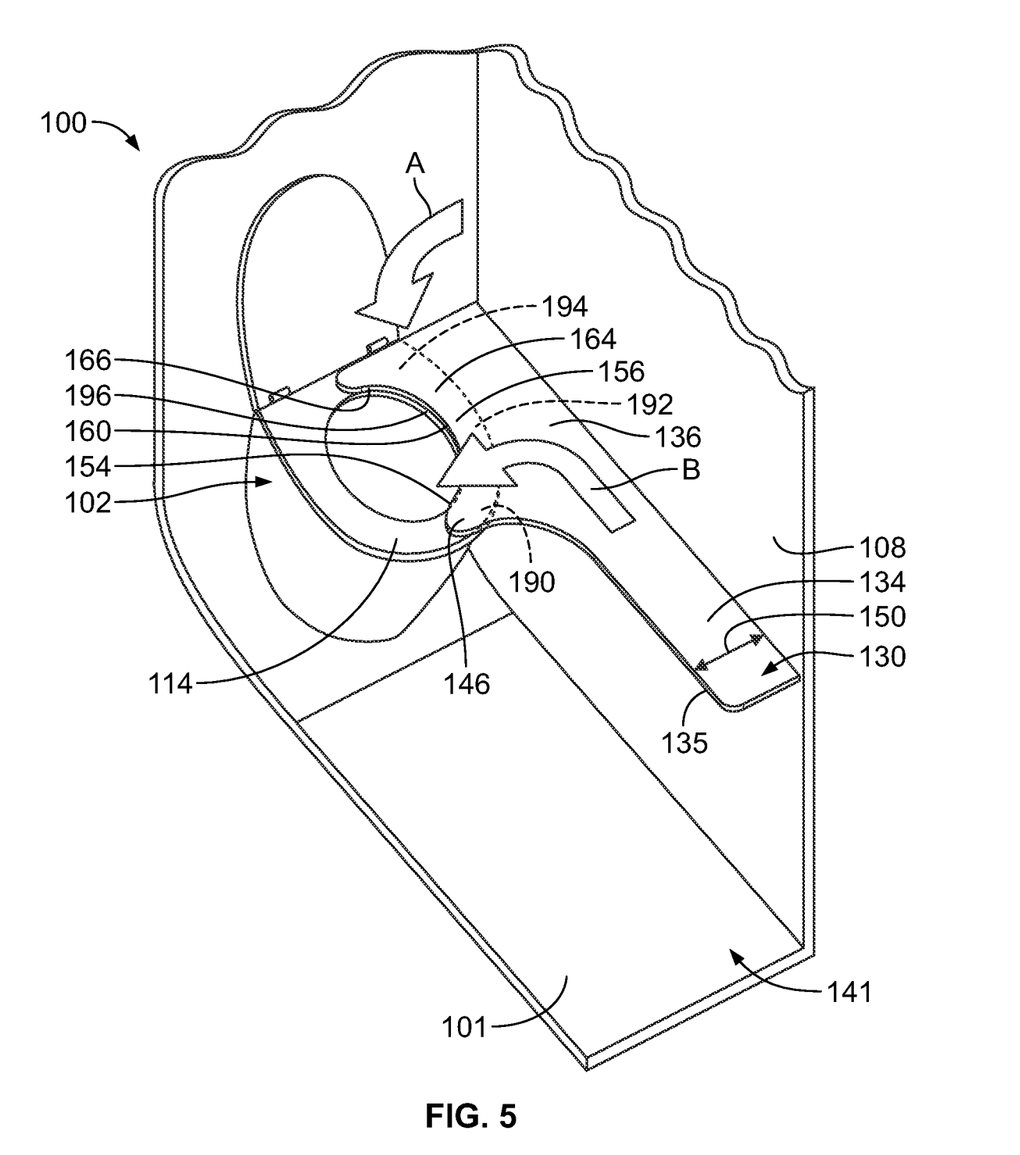
FIG. 5 illustrates a perspective top view of the lavatory having the transfer member in a deployed position, according to an embodiment of the present disclosure.
Figure 6:
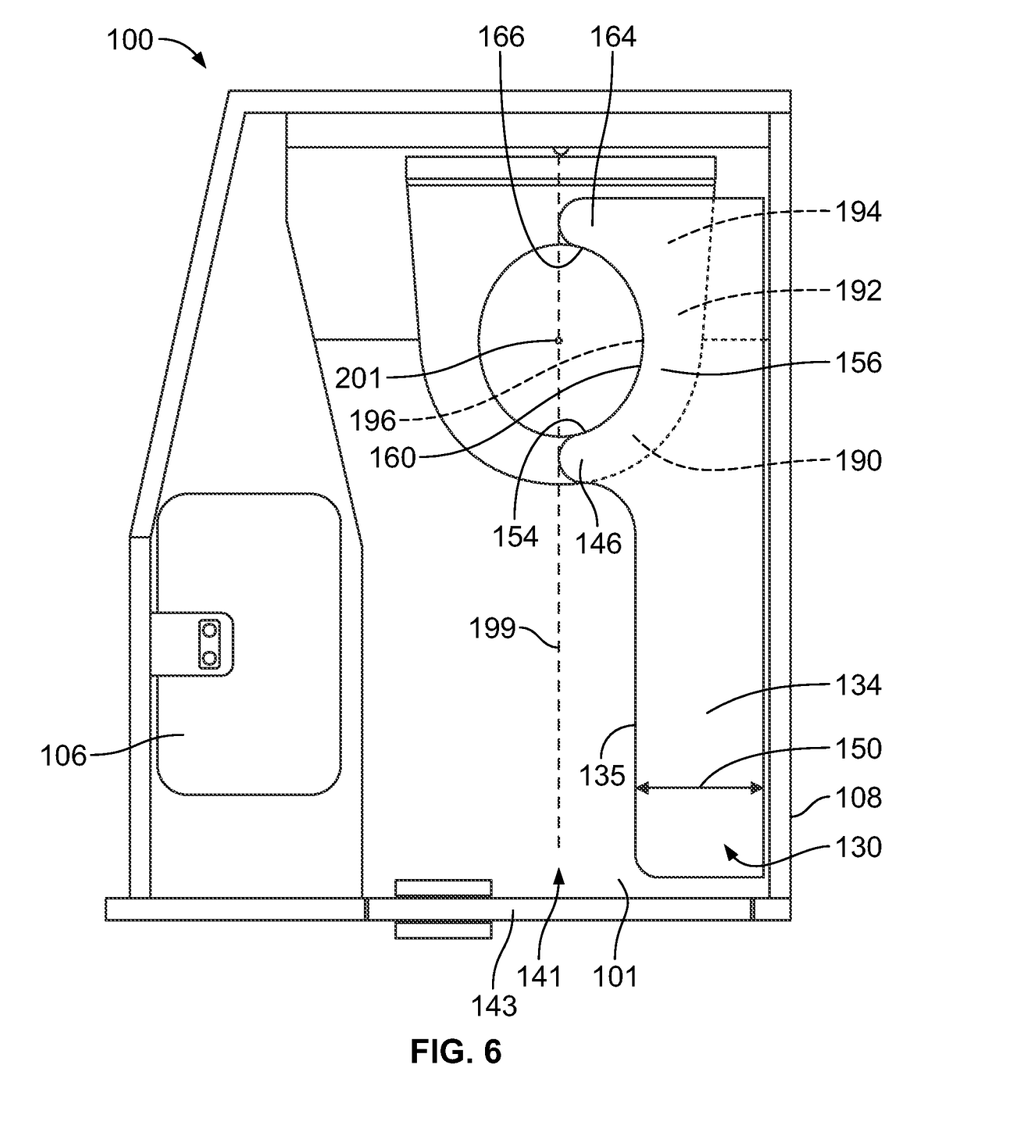
FIG. 6 illustrates a top view of the lavatory having the transfer member in the deployed position.

Alternatively, the toilet segment 136 may not include the front arcuate support 146 and/or the rear arcuate support 164. For example, in at least one embodiment, when the transfer member 130 is in the deployed position (as shown in FIGS. 5 and 6), the toilet segment 136 may be supported on the seat 114 only by the intermediate body 156.

As shown in FIGS. 3 and 4, the transfer member 130 is in a stowed position. In the stowed position, the transfer member 130 is folded upright against the side wall 108. For example, in the stowed position, a first or upper surface 168 of the transfer member 130 is proximate to the side wall 108. In at least one embodiment, the first surface 168 may abut directly against the side wall 108 and/or be parallel to the side wall 108. Further, in the stowed position, a second or lower surface 170 (which is opposite from the first surface 168) of the transfer member 130 is exposed and readily viewable by an individual within the lavatory 100. In the stowed position, the transfer member 130 may be perpendicular to the surface of the base floor 101. For example, the base floor 101 may be horizontal, and the transfer member 130 in the stowed position may be vertical.

The transfer member 130 is movably coupled to the side wall 108. For example, the transfer member 130 is pivotally coupled to the side wall 108. In at least one embodiment, the transfer member 130 is moveably coupled to the side wall 108 by one or more hinges 172. In at least one embodiment, the hinges 172 may be or otherwise include rotary damper barrel hinges. The transfer member 130 is configured to be moved between the stowed position, as shown in FIGS. 3 and 4, and a deployed position, as shown in FIGS. 5 and 6.

In at least one embodiment, the transfer member 130 may also include one or more securing devices 174 configured to securely couple to one or more reciprocal securing devices 176 mounted on the side wall 108. For example, the securing devices 174 and 176 may be magnets, latches, hooks and loops, and/or the like. The securing device 174 couples to the securing device 176 when the transfer member 130 is in the stowed position to securely retain the transfer member 130 in the stowed position. The securing devices 174 and 176 may be at various locations, such as proximate to the rear wall 110, the front end of the side wall, or the like. Optionally, the transfer member 130 and the side wall 108 may not include securing devices.

As shown in FIGS. 3 and 4, the transfer member 130 may be devoid of support struts, brackets, or the like that would otherwise connect to and/or extend from the second surface 170. Alternatively, one or more deployable struts, braces, or the like may be coupled to the transfer member 130, and configured to provide a bracing support in relation to the side wall 108. As described herein, the seat 114 of the toilet 102 supports the transfer member 130 (and a weight of an individual seated on the transfer member 130) when the transfer member 130 is in the deployed position.

The transfer member 130 is secured to an outer surface of the side wall 108. As such, an existing lavatory may be effectively retrofit with the transfer member 130. As another example, a new lavatory may be formed with the transfer member 130. In at least one embodiment, the side wall 108 may include a recessed pocket that receives the transfer member 130 in the stowed position. In such an embodiment, the transfer member 130 in the stowed position may not extend past an exposed interior surface 177 of the side wall 108.

FIG. 5 illustrates a perspective top view of the lavatory 100 having the transfer member 130 in a deployed position, according to an embodiment of the present disclosure. FIG. 6 illustrates a top view of the lavatory 100 having the transfer member 130 in the deployed position.

In order to move the transfer member 130 into the deployed position, an individual grasps a portion of the transfer member 130 (such as at exposed edges), and pivots or folds the transfer member 130 downwardly in the direction of arc A. For example, the transfer member 130 pivots in the direction of arc A about one or more pivot axis 173 of the hinges 172. When the transfer member 130 is in the deployed position, the bench segment 134 extends toward the sink 106. For example, a front edge 135 of the bench segment 134 is closer to the sink 106 in the deployed position than when the transfer member 130 is in the stowed position.

The transfer member 130 continues to be pivoted in the direction of arc A, until the toilet segment 136 abuts against a portion of the seat 114 of the toilet 102 (such as lateral segment closest to the side wall 108). As such, the transfer member 130 is in the deployed position.

In the deployed position, the front arcuate support 146 of the toilet segment 136 is supported by a front lateral segment 190 of the seat 114, the intermediate body 156 proximate to the recess 158 is supported by a lateral segment 192 of the seat 114, and the rear arcuate support 164 is supported by a rear lateral segment 192 of the seat 114. The exposed edges 154, 160, and 166 conform to an inner edge 196 of the seat 114. As such, the toilet segment 136 may not extend over the central opening 120 of the seat 114.

Because the toilet 102 supports (such as directly via the seat 114) the weight of the transfer member 130 in the deployed position, the toilet 102 also supports a weight of an individual seated on the transfer member 130 in the deployed position. As such, the transfer member 130 can be formed of lighter materials, as the transfer member 130 does not support an entire weight of a seated individual.

In the deployed position, as shown, the bench segment 134 extends toward the sink 106. The width 150 of the bench segment 134 in the deployed position is sized to provide sufficient seating area for an individual, while at the same allowing for movement of legs within the lavatory 100. For example, the width 150 of the bench segment 134 is sized so that the bench segment 134 (in the deployed position) does not extend to a central longitudinal plane 199 that extends through a center 201 of the toilet 102.

In the deployed position, the transfer member 130 may be parallel to a surface of the base floor 101. For example, in the deployed position, the transfer member 130 may be horizontal.

An individual may sit on the bench segment 134 and move onto the toilet segment 136, such as by sliding. The outer, exposed surfaces of the transfer member 130 are smooth, with rounded, blunted exposed edges. As such, the individual may easily slide over the transfer member 130 without fear of clothing being snagged, skin being pinched, or the like. The individual may slide from the transfer member 130 over and onto the seat 114 of the toilet 102 in the direction of arrow B. When the individual is seated over the toilet 102, the toilet 102 supports the weight of the individual, as the toilet segment 136 is supported by the seat 114.

Figure 7:
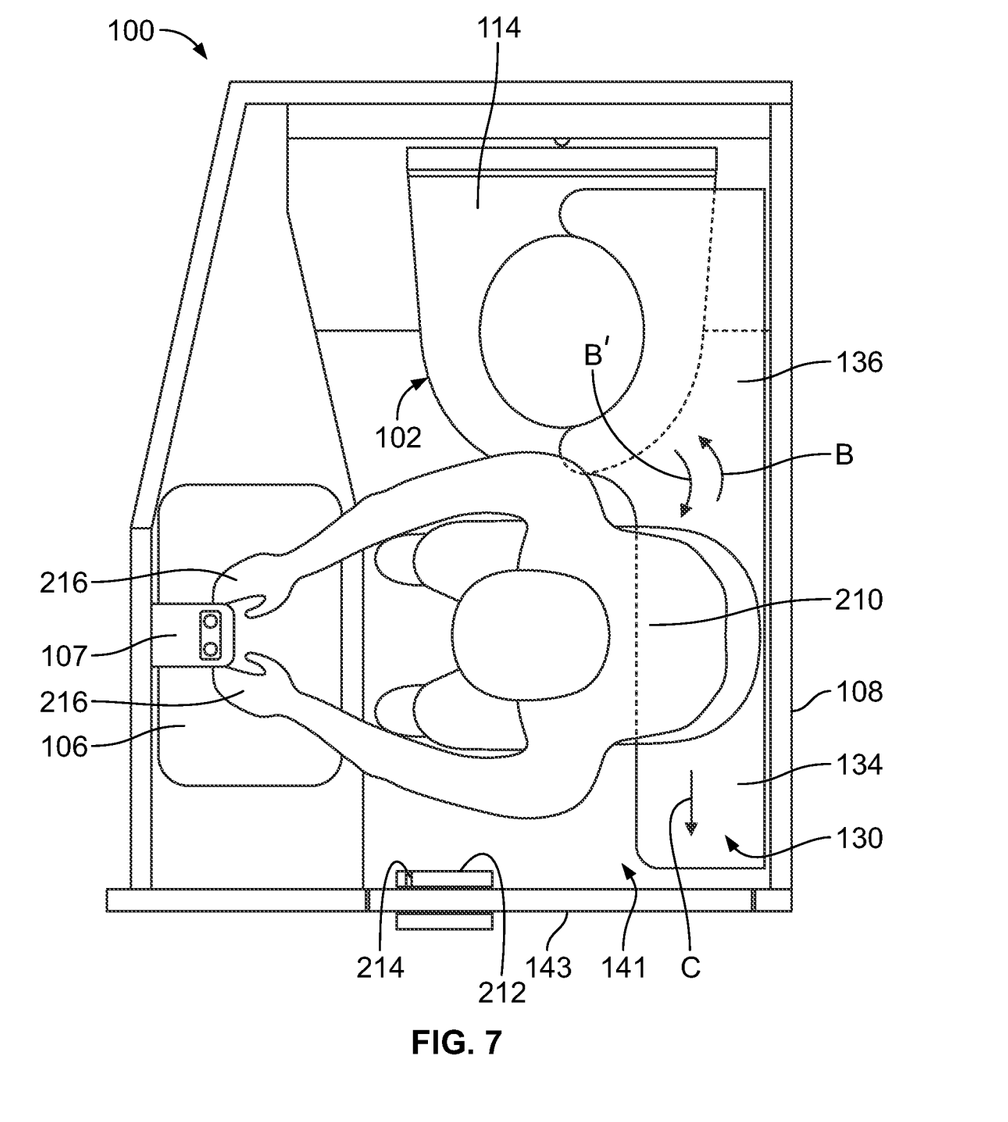
FIG. 7 illustrates a top view of an individual seated on a bench segment of the transfer member in the deployed position, according to an embodiment of the present disclosure.
Figure 8:
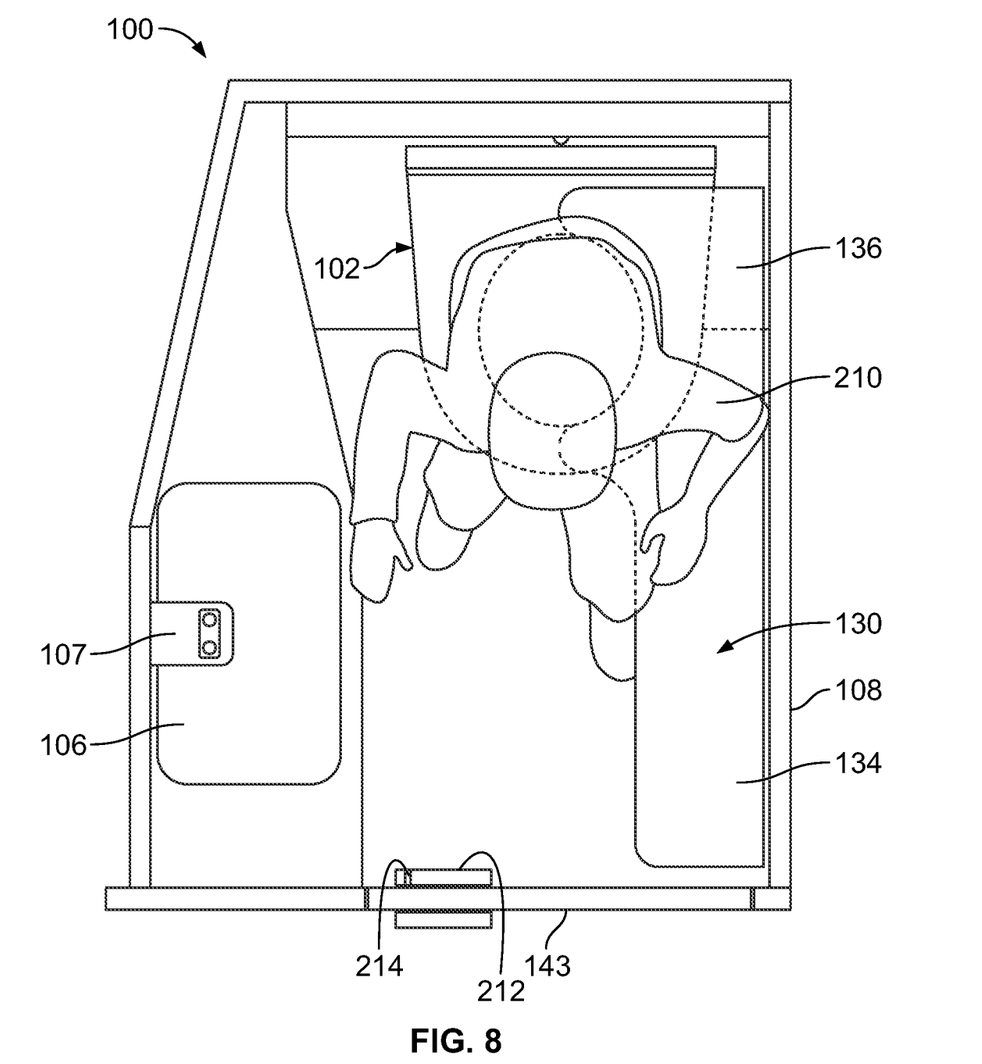
FIG. 8 illustrates a top view of the individual seated on a toilet within the lavatory, according to an embodiment of the present disclosure.

FIG. 7 illustrates a top view of an individual 210 seated on the bench segment 134 of the transfer member 130 in the deployed position, according to an embodiment of the present disclosure. FIG. 8 illustrates a top view of the individual 210 seated on the toilet 102 within the lavatory 100. Referring to FIGS. 3-8, the individual 210 approaches the lavatory 100 from outside the entrance 141. With the door 143 open, for example, the individual 210 grasps the transfer member 130 in the stowed position, and moves the transfer member 130 into the deployed position. The individual 210 then sits on the bench segment 134, and the door 143 is closed with the individual 210 in the lavatory 100. When the transfer member 130 is in the deployed position, and the individual 210 is seated on the bench segment 134 facing the sink 106, the individual 210 is close to a handle 212 of the door 143. That is, at least a portion of the bench segment 134 is proximate to the door 143 (such as within 12 inches or less) when the transfer member 130 is in the deployed position, thereby allowing an individual seated on the bench segment 134 to easily reach the door 143, the handle 212, and a lock 214. As such, the individual 210 seated on the bench segment 134 may readily engage the lock 214 to ensure that the door 143 is locked.

The individual 210 may then slide over the transfer member 130 in the direction of arrow B from the bench segment 134 onto the toilet segment 136 and the toilet 102. The individual 210 then readies for toilet use, and subsequently uses the toilet 102. After use of the toilet 102, the individual 210 adjusts clothing, for example, and slides from the toilet segment 136 back onto the bench segment 134 in the direction of arrow B' to face the sink 106. The bench segment 134 provides the individual 210 with a comfortable seating position at which the individual 210 can wash hands 216 with water from a faucet 107 over the sink 106.

After the individual 210 finishes washing hands 216, the individual may unlock and open the door 143, and slide off the bench segment 134 in the direction of arc C out of the entrance 141. The transfer member 130 may then be moved into the stowed position.

Figure 9:
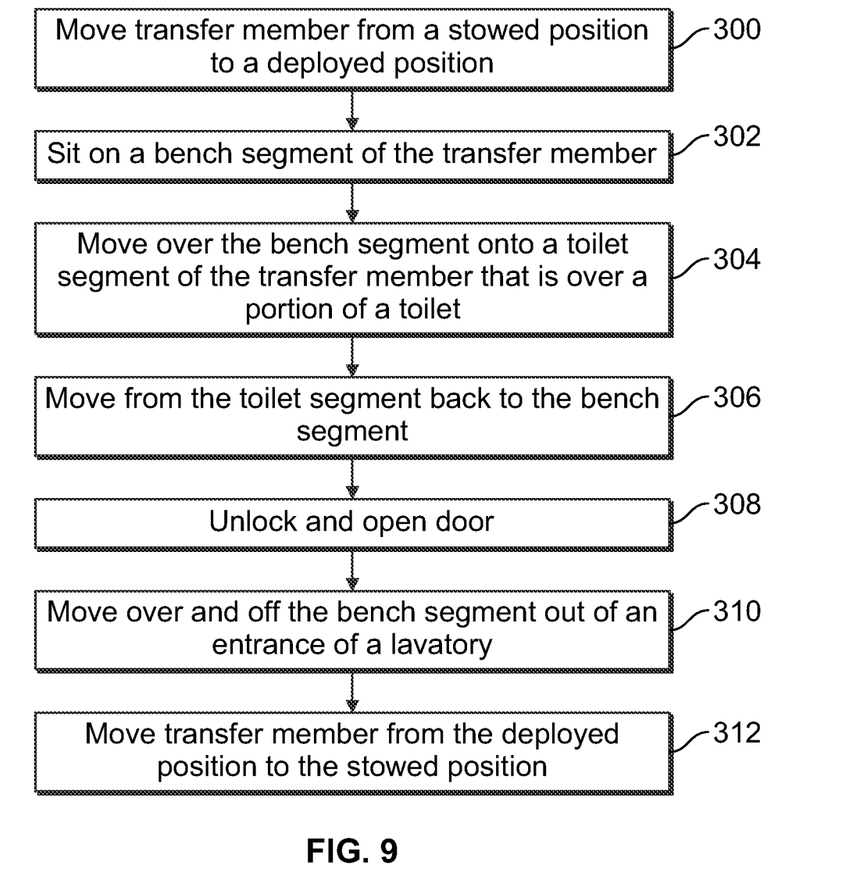
FIG. 9 illustrates a flow chart of a method of operating a transfer member within a lavatory, according to an embodiment of the present disclosure.

FIG. 9 illustrates a flow chart of a method of operating the transfer member 130 within with lavatory, according to an embodiment of the present disclosure. Referring to FIGS. 3-9, at 300, the transfer member 130 is moved from the stowed position to the deployed position. At 302, the individual 210 sits on the bench segment 134 of the transfer member 130 in the deployed position. At 304, the individual 210 moves over (such as by sliding) the bench segment 134 onto the toilet segment 136 over a portion of the toilet 102. When toilet use is complete and the individual 210 has readjusted clothing, the individual 210 then moves over the toilet segment 136 back to the bench segment 134 at 306. After hand washing, the individual 210 unlocks and opens the door 143 at 308. Then, at 310, the individual 210 moves over and off the bench segment 134 out of the entrance of the lavatory 100. The transfer member 130 is then moved from the deployed position to the stowed position at 312.

Figure 10:
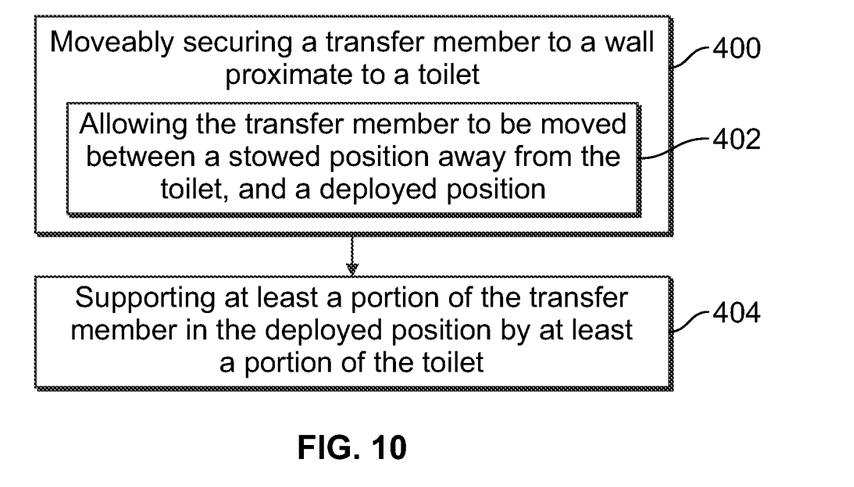
FIG. 10 illustrates a flow chart of a method of providing a lavatory, according to an embodiment of the present disclosure.

FIG. 10 illustrates a method of providing a lavatory, according to an embodiment of the present disclosure. Referring to FIGS. 3-8 and 10, the method includes moveably securing, at 400, the transfer member 130 to a wall (such as the side wall 108) proximate to the toilet 102. The moveably securing 400 includes allowing, at 402, the transfer member 130 to be moved between the stowed position away from the toilet 102, and the deployed position. The method also includes supporting, at 404, at least a portion of the transfer member 130 in the deployed position by at least a portion of the toilet 102.

In at least one example, said supporting includes supporting a toilet segment 136 of the transfer member 130 by the at least portion of the toilet 102 when the transfer member 130 is in the deployed position. In at least one example, the method also includes extending a front end of the bench segment 134 of the transfer member 130 toward the sink 106 when the transfer member 130 is in the deployed position.

In at least one example, the method also includes folding the transfer member 130 upright against the wall when the transfer member 130 is in the stowed position.

In at least one example, the method also includes pivotally coupling the transfer member 130 to the wall by one or more hinges 172.

In at least one embodiment, the method also includes coupling the first securing device 174 of the transfer member 130 to the second securing device 176 of the wall when the transfer member 130 is in the stowed position to securely retain the transfer member 130 in the stowed position.

As described herein, embodiments of the present disclosure provide a system and method for allowing individuals to independently more easily and efficiently use an existing lavatory, such as within an internal cabin of a commercial aircraft. Further, embodiments of the present disclosure provide a lavatory that is easily accessible and useable by persons of reduced mobility. Additionally, embodiments of the present disclosure provide a safe, readily accessible, consistent, independent, and easy-to-use system and method for transferring between different areas within a lavatory.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A lavatory comprising:
a toilet;
a wall proximate to the toilet; and
a transfer member moveably secured to the wall,
the transfer member moveable between a stowed position away from the toilet, and a deployed position, wherein the transfer member in the deployed position is configured to allow an individual to slide over the transfer member onto the toilet.

2. The lavatory of claim 1, wherein the lavatory is within an internal cabin of a vehicle.

3. The lavatory of claim 1, wherein the transfer member comprises:
a bench segment; and
a toilet segment.

4. The lavatory of claim 3, further comprising a sink, wherein the bench segment includes a front end proximate to an entrance of the lavatory, and wherein the bench segment extends toward the sink when the transfer member is in the deployed position.

5. The lavatory of claim 3, wherein the front end is proximate to a door of the lavatory when the transfer member is in the deployed position.

6. The lavatory of claim 3, wherein the toilet segment is wider than the bench segment.

7. The lavatory of claim 3, wherein the toilet segment comprises:
a front end including a front arcuate support including a first arcuate support prong having a first arcuate, smooth, and blunted exposed edge;
an intermediate body connected to the front end, wherein the intermediate body comprises an inwardly-curved recess having a second arcuate, smooth, and blunted exposed edge; and
a rear end including a rear arcuate support including a second arcuate support prong having a third arcuate, smooth, and blunted exposed edge.

8. The lavatory of claim 1, wherein the transfer member in the stowed position is folded upright against the wall.

9. The lavatory of claim 1, further comprising one or more hinges that pivotally couples the transfer member to the wall.

10. The lavatory of claim 1, wherein the transfer member comprises a first securing device, and the wall comprises a second securing device, and wherein the first securing device couples to the second securing device when the transfer member is in the stowed position to securely retain the transfer member in the stowed position.

11. A method of providing a lavatory, the method comprising:
moveably securing a transfer member to a wall proximate to a toilet, wherein said moveably securing comprises allowing the transfer member to be moved between a stowed position away from the toilet, and a deployed position, wherein the transfer member in the deployed position is configured to allow an individual to slide over the transfer member onto the toilet.

12. The method of claim 11, further comprising supporting at least a portion of the transfer member in the deployed position.

13. The method of claim 12, further comprising extending a front end of a bench segment of the transfer member toward a sink when the transfer member is in the deployed position.

14. The method of claim 13, wherein the front end is proximate to a door of the lavatory when the transfer member is in the deployed position.

15. The method of claim 11, further comprising folding the transfer member upright against the wall when the transfer member is in the stowed position.

16. The method of claim 11, further comprising pivotally coupling the transfer member to the wall by one or more hinges.

17. The method of claim 11, further comprising coupling a first securing device of the transfer member to a second securing device of the wall when the transfer member is in the stowed position to securely retain the transfer member in the stowed position.

18. A vehicle comprising:
an internal cabin; and
a lavatory within the internal cabin, the lavatory comprising:
a toilet;
a wall proximate to the toilet; and
a transfer member moveably secured to the wall,
the transfer member moveable between a stowed position away from the toilet, and a deployed position,
wherein the transfer member comprises a bench segment, and a toilet segment.

19. The vehicle of claim 18, further comprising a sink, wherein the bench segment includes a front end proximate to an entrance of the lavatory, wherein the bench segment extends toward the sink when the transfer member is in the deployed position, wherein the front end is proximate to a door of the lavatory when the transfer member is in the deployed position, wherein the toilet segment is wider than the bench segment, and wherein the transfer member in the stowed position is folded upright against the wall.

20. The vehicle of claim 19, wherein the toilet segment comprises:
a front end including a front arcuate support including a first arcuate support prong having a first arcuate, smooth, and blunted exposed edge;
an intermediate body connected to the front end, wherein the intermediate body comprises an inwardly-curved recess having a second arcuate, smooth, and blunted exposed edge; and
a rear end including a rear arcuate support including a second arcuate support prong having a third arcuate, smooth, and blunted exposed edge.

* * * * *